3,522,270
POLYAMIDE-POLYIMIDE RESIN
David W. Glaser, St. Paul, Minn., assignor to General Mills, Inc., a corporation of Delaware
No Drawing. Filed Aug. 26, 1966, Ser. No. 575,261
Int. Cl. C07d 27/52; C09d 11/06
U.S. Cl. 260—326   4 Claims

ABSTRACT OF THE DISCLOSURE

This invention relates to the reaction product of an alkylene diamine, a polymeric fat acid, an anhydride acid, and certain monocarboxylic acids. The polyamide-polyimide resins thus formed are useful as flexographic ink binders.

---

This invention relates to novel polyamide-polyimide resins, their process of preparation and the use thereof as a flexographic ink binder. In particular, the invention relates to polyamide-polyimide resins of an alkylene diamine, a polymeric fat acid, an anhydride acid, and certain monocarboxylic acids.

Resins suitable for use as ink binders in flexographic inks must provide a desirable combination of properties such as (1) low viscosity
(2) good solution stability in isopropanol
(3) good reducibility with isopropanol and denatured ethanol
(4) good compatibility with nitrocellulose
(5) good extensibility
(6) good gloss
(7) good adhesion to polyethylene and other polydiolefins after immersion in ice water, and
(8) low odor.

The polyamide-polyimide resins of this invention have been found to possess the combination of properties mentioned above when used in flexographic inks which are accordingly the primary area of use of the resins. The resins, however, may also find utility in lacquers and rotogravure inks.

As indicated earlier hereinabove, the particular polyamide-polyimide resins of this invention are those prepared by reacting under conventional amidification conditions, an alkylene diamine, a polymeric fat acid, an anhydride, and certain monocarboxylic acids.

In general, the resins are preferably prepared by reaction in the temperature range of 100–300° C. accompanied by removal of any by-product water. The reaction is preferably conducted in a two step temperature procedure by formation of the polyamide using the acids and diamine at a maintained temperature of about 140–160° C. for about ¼ to 1 hour, followed by raising the temperature to about 200–250° C. and maintaining said temperature for a period of time of from 1 to 2 hours. The anhydride is preferably added at this point and the reaction continued at 200–250° C. for from 1 to 2 hours. The total time of reaction is not critical and it is merely required that the time be sufficiently long to provide a polyamide-polyimide resin. Usually the total time of reaction will be about 2 to 8 hours. Longer reaction times may be employed but generally are not necessary.

The alkylene diamines that are preferably employed are those of the formula

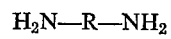

where R is an alkylene radical having from 2 to 8 carbon atoms such as, ethylene diamine, diamino propane, diaminobutane, and hexamethylene diamine. R may be branched or straight chained, the straight chained radicals being more preferred.

Polymeric fat acids are commercially available products. A description of these acids and their method of preparation may be found in U.S. Pat. 3,201,471. As indicated in this patent, polymeric fat acids result from the polymerization of saturated, ethylenically unsaturated or acetylenically unsaturated naturally occurring or synthetic monocarboxylic aliphatic acids containing from 8 to 24 carbon atoms. Commercially the 18 carbon atom monocarboxylic acids such as oleic, linoleic, linolenic, and eleostearic acids are employed as starting materials for the preparation of the polymeric fat acids. Tall oil fatty acids which are predominantly a mixture of oleic and linoleic acids is the most common starting material.

After polymerization with or without a catalyst, the resulting product, is a mixture of predominantly dimeric fat acids, some trimeric and higher polymeric fat acids and some unpolymerized monomeric fat acids. Commercially available polymeric fat acids will have a dimeric fat acid content of about 60–80% by weight, a trimeric and higher polymeric fat acid content of about 10 to 35%, and a monomeric fat acid content of about 5 to 15% by weight. For the purposes of this invention, it is preferable that the dimeric fat acid content not exceed 85% by weight and that the monomeric fat acid content not exceed 5% by weight.

Reference has been made above to the monomeric, dimeric, and trimeric fat acids present in the polymeric fat acids. The amounts of monomeric fat acids, often referred to as monomer (M), dimeric fat acids, often referred to as dimer (D), and trimeric or higher polymeric forms, often referred to as trimer (T), may be determined by the micromolecular distillation analytical method of R. F. Paschke et al., J. Am Oil Chem. Soc., XXXI (No. 1), 5, (1954), wherein the distillation is carried out under high vacuum (below 5 microns) and the monomeric fraction is calculated from the weight of product distilling at up to 155° C., the dimeric fraction calculated from that distilling from 155 to 250° C., and the trimeric (or higher) fraction based on the residue. Unless otherwise indicated, this analytical method was employed in the analysis of the polymeric fat acids employed in this invention.

The polymeric fat acids may be fractionated to provide products having higher dimer contents, by conventional distillation or solvent extraction techniques may be employed therefor. They may also be hydrogenated (before or after distillation) to reduce unsaturation, under hydrogen pressure in the presence of a hydrogenation catalyst. It is also understood that such other derivatives of polymeric fat acids which are capable of forming amides in reaction with a diamine, such as the lower alcohol (1–8 carbon atoms) esters of polymeric fat acids may be employed in place of the acids themselves in which the by-product is then a lower alcohol rather than water.

The monocarboxylic acids to be employed in admixture with the polymeric fat acids are preferably isobutyric acid, 2-ethyl butyric, and 2-ethyl hexoic acid. These may be used alone or a mixture thereof may be employed, mixtures thereof being most preferred.

The preferred anhydride to be employed is hexahydrophthalic anhydride. With the combination of this anhydride and the preferred monocarboxylic acids described hereinabove, significant improvement or reduction in odor results. Other anhydrides which may be employed in place of the hexahydrophthalic anhydride are phthalic anhydride, glutaric anhydride, decenyl succinic anhydride, dodecenyl succinic anhydride, itaconic anhydride, and tetrahydrophthalic anhydride.

It is preferred that the polymeric fat acid account for from 70 to 75 equivalent percent of the acid component employed including the anhydride. The monocarboxylic acid (alone or mixture thereof) preferably accounts for from 10 to 22 equivalent percent, the remainder equivalent percent being furnished by the anhydride (8 to 15 carboxyl equivalent percent).

Where special properties are desired to change some properties such as softening point and alcohol solubility, a co-modifying acid component may be employed in addition to the anhydride or monocarboxylic acid described hereinabove. Where employed, such co-modifying acid component may be employed in an amount up to 25 equivalent percent based on the total content of anhydride and monocarboxylic acid described above. Illustrative of such acids are lower aliphatic monocarboxylic acids such as acetic and propionic acids; hydroxy monocarboxylic acid such as lactic, glycolic, β-hydroxypropionic, α-hydroxy-n-caproic, β-methylpropylhydracrylic acid, tetramethylhydracrylic acid, β-hydroxy-α-diethylbutyric, salicylic, phenylglycolic, and phenylacetic acids; relatively low molecular weight dicarboxylic acids such as succinic or phthalic acid.

Total carboxylic equivalents (derived from the polymeric fat acid, monocarboxylic acid and acid anhydride) are balanced with such a number of amine equivalents to provide a polyamide-polyimide product having about equal and low amine and acid numbers (below 25 and preferably below 10). It is preferable that the amine equivalents be at least 90% of the carboxyl (including anhydride) equivalents employed. Expressed in ratio form, the ratio of amine groups to carboxyl groups is preferably 0.9:1 to 1:1.

The amounts of reactants preferably employed may also be expressed as follows:

| Reactant: | Equivalent percent |
|---|---|
| Total carboxyl | 100 |
| (a) Polymeric fat acids | 70 to 75 |
| (b) Hexahydrophthalic anhydride | 8 to 15 |
| (c) Monocarboxylic acids | 10 to 22 |
| Diamine | 90 to 100 |

The invention can best be illustrated by means of the following examples in which the resins were prepared by the following procedure.

RESIN PREPARATION

The reactants, except the hexahydrophthalic anhydride (see Table I for the reactants), are charged into a round-bottom 3-neck flask fitted with a thermometer, mechanical stirrer and distilling column and head. The mixture is stirred and heated to 140° C. and held at this temperature about 0.5 hour, at which point the by-product water begins to distill off. The temperature is increased to about 225° C. and held at this temperature for 2 hours, at which time the hexahydrophthalic anhydride in molten form is added. The reaction is continued at about 225° C. for an additional hour and then under vacuum for an hour at 225° C. (The anhydride is added at the indicated point in the reaction so as to minimize the possible loss of the somewhat volatile and slow-reacting acids and to increase the formation of imide.) The vacuum is then released and the product removed from the flask.

A varnish for a flexographic ink is prepared by dissolving the polyamide resin as 35% non-volatiles in isopropanol (99%).

Several resins employing hexahydrophthalic anhydride and polymerized tall oil fatty acids were prepared by the above-described method of preparation and evaluated for use as a flexographic ink binder. The reactants, amounts, and evaluation can be seen from the following Table I.

TABLE I

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Composition-Equivalent Percent: | | | | | | | | | | | | | | | |
| Polymeric fat acid [1] | 73.0 | 73.7 | 73.7 | 72.8 | 73.2 | 73.5 | 74.7 | 73.8 | 74.3 | 71.8 | 71.9 | | | | |
| Polymeric fat acid [2] | | | | | | | | | | | | 71.3 | 71.7 | 72.0 | 72.0 |
| Hexahydrophthalic anhydride | 6.6 | 6.6 | 6.7 | 8.2 | 9.9 | 11.7 | 13.5 | 13.4 | 13.4 | 9.8 | 9.7 | 6.4 | 6.5 | 10.0 | 10.0 |
| Isobutyric acid | 10.2 | 7.0 | 6.8 | 12.0 | 10.7 | 9.4 | 5.5 | 8.1 | | 8.0 | 10.4 | 10.4 | 7.9 | 10.0 | 10.0 |
| 2-ethyl hexoic acid | 10.2 | | | | | | | | 12.3 | 10.4 | 8.0 | 11.9 | 13.9 | 8.0 | 8.0 |
| 2-ethyl butyric acid | | 10.2 | 8.7 | 7.0 | 6.2 | 5.4 | 6.3 | 4.7 | | | | | | | |
| Succinic anhydride | | | 4.1 | | | | | | | | | | | | |
| Ethylenediamine | 98.4 | 99.3 | 97.3 | 97.0 | 95.5 | 93.7 | 97.5 | 93.3 | 93.6 | 95.7 | 95.7 | 98.0 | 98.0 | 96.5 | 96.5 |
| Resin Properties: | | | | | | | | | | | | | | | |
| Softening point B and R ° C | 105 | 103 | 102 | 109 | 102 | 105 | 99 | 103 | 94 | 103 | 105 | 102 | 101 | 103 | 106 |
| Amine number | 5.1 | 9.3 | 7.3 | 5.1 | 4.6 | 2.0 | 7.0 | 2.6 | 5.0 | 5.1 | 4.3 | 5.0 | 6.9 | 4.4 | 4.6 |
| Acid number | 3.6 | 1.7 | 1.4 | 3.1 | 4.1 | 5.1 | 1.7 | 4.3 | 4.5 | 5.0 | 6.0 | 3.4 | 7.7 | 3.6 | 4.7 |
| Properties as 35% N.V. in IPA [3]: | | | | | | | | | | | | | | | |
| Color-Gardner | 8+ | 11+ | 10+ | 8+ | 8+ | 8+ | 8+ | 8+ | 8+ | 7+ | 8+ | 9 | 7+ | 7+ | 7+ |
| Viscosity-Gardner-Holdt | B+ | B+ | C+ | B+ | B+ | B+ | B+ | C+ | C+ | B+ | B+ | B | B | B | B |
| Stability at 73 ° F., days | 34+ | 27+ | 27+ | 27+ | 49+ | 51+ | 27+ | 51+ | 51+ | [5]38+ | [5]35+ | [5]30+ | 30+ | [5]24+ | [5]24+ |
| Gel Recovery at 40° F., minutes | 45 | 70 | 70 | 120 | 140 | 170 | 70 | 140 | 55 | 130 | 85 | 90 | 75 | 105 | 140 |
| Reducibility with IPA percent solids at hazepoint | 1– | 1– | 1– | 1– | | 1– | 1– | 1– | 1– | | | | | 1– | 1– |
| Reducibility with Filmex Al [4] percent solids at hazepoint | 16.6 | 18 | 20 | 18 | 17.6 | 21 | 20 | 21 | 22 | | 17.6 | 15.8 | 16.1 | 16.6 | 16.8 |
| Nitrocellulose compatability percent SS-¼ N.C. Solids | | | | | 40–80 | | | | | | | | | 60–80 | 60–80 |
| Coating Properties: | | | | | | | | | | | | | | | |
| Hardness-Sward | 15 | 15 | 15 | 16 | 15 | 15 | 13 | 15 | | 16 | 16 | 15 | 14 | 15 | 15 |
| Extensibility .percent-G.E | | | | | | | | | | | | | | 60+ | 60+ |
| Tack free time-minutes | | | | | 3.75 | | | | | | | | | 3.75 | 3.75 |
| Blocking 120° F., 1 p.s.i., high humidity, face to face | | | | | | | | | | | | | | 30% | 30% |
| White Ink on Polyethylene: | | | | | | | | | | | | | | | |
| Gloss, 4 rolls | 73 | 70 | 68 | 70 | 73 | 69 | 72 | 67 | | 71 | 71 | 69 | 70 | 68 | 65 |
| Ice Crinkle test-10=perfect. 2rolls | 6 | 2 | 2 | 2 | 2 | 2 | 8 | 4 | 8 | 4 | 4 | 4 | 4 | 6 | 6 |

[1] Typical analysis: Percent M=1; % M=79; Percent T=20; Acid Val.=191; Sap. Val.=199.
[2] Typical analysis: Percent M=3; % D=76; Percent T=21; Acid Val.=191; Sap. Val.=199.
[3] IPA=isopropanol 99+% grade.
[4] Filmex Al=anhydrous denatured ethanol; SS=spirits soluble; NC=nitrocellulose.
[5] Part.

Several resins employing anhydride other than hexahydrophthalic anhydride were prepared by the earlier described method of preparation. The compositions and results can be seen from the following Table II:

TABLE II

| | Example No. | | | | | | | |
|---|---|---|---|---|---|---|---|---|
| | 16 | 17 | 18 | 19 | 20 | 21 | 22 | 23 |
| Composition, Eq. percent: | | | | | | | | |
| Polymeric fat acid [1] | 72 | 72 | 72 | 72 | 72 | 72 | 72 | 72 |
| Phthalic anhydride | 10 | 10 | | | | | | |
| Glutaric anhydride | | | 10 | | | | | |
| Decenyl succinic anhydride | | | | 10 | | | | |
| Dodecenyl succinic anhydride | | | | | 10 | | | |
| Itaconic anhydride | | | | | | 10 | | |
| Trimellitic anhydride | | | | | | | 10 | |
| Tetrahydrophthalic anhydride | | | | | | | | 10 |
| 2-Ethyl hexoic acid | 8 | 8 | 8 | 8 | 8 | 8 | 8 | 8 |
| Isobutyric acid | 10 | 10 | 10 | 10 | 10 | 10 | 10 | 10 |
| Ethylenediamine | 96.5 | 96.5 | 96.5 | 93.5 | 96.5 | 96.5 | 96.5 | 96.5 |
| Resin Properties: | | | | | | | | |
| Softening point, B and R ° C | 103 | 103 | 115 | 105 | 103 | 105 | 110 | 104 |
| Amine number | 5.3 | 6.4 | 2.3 | 4.0 | 5.5 | 5.2 | 5.7 | 6.2 |
| Acid number | 4.0 | 3.1 | 3.7 | 4.0 | 3.0 | 3.9 | 7.0 | 4.4 |
| Properties as 35% N.V. in IPA: | | | | | | | | |
| Color-Gardner | 8+ | 8+ | 6+ | 6+ | 7 | 12+ | 13− | 6+ |
| Viscosity-Gardner-Holdt | B | B− | B− | A | A | C | C | B− |
| Stability at 73° F., days | [2]58+ | 22+ | 23+ | 23+ | [2]32+ | [2]32+ | 29+ | 29+ |
| Gel recovery at 40° F., minutes | 105 | ([3]) | ([3]) | ([3]) | 140 | 140 | 75 | 75 |
| Reducibility with IPA percent solids at haze point | | | | | | | | |
| Reducibility with Filmex Al percent solids at haze point | | | | | | | | |
| Nitrocellulose compatability percent SS-¼ N.C. Solids | | | | | | | | |
| Coating Properties: | | | | | | | | |
| Hardness, Sward | 15 | | | | | | | |
| Extensibility, percent, G.E. | 60+ | | | | | | | |
| Tack free time, min | | | | | | | | |
| Blocking 120° F., 1 p.s.i., high humidity-face to face | 65 | | | | | | | |
| White Ink on Polyethylene: | | | | | | | | |
| Gloss, 4 rolls | 74 | 62 | | | 64 | 63 | 62 | 63 |
| Ice Crinkle test, 2 rolls | 6 | 2 | 4 | 9 | 9 | 6 | 2 | 0 |

[1] Polymerized tall oil fatty acids, percent M=3; percent D=76; percent T=21.  [2] Part.  [3] None.

A typical ink formulation consists essentially of the resin as a binder, a solvent therefore and a pigment. Other optional ingredients are modifiers to provide optional characteristics. An ink formulation with the present resins will preferably be as follows:

| Component: | Amount, percent by weight |
|---|---|
| Resin | 20–30 |
| Solvent | 50–70 |
| Pigment | 10–20 |

Modifiers where employed will preferably be employed in an amount of about 3–7% by weight based on the total composition.

The solvents preferably are alcohols such as isopropanol or n-propanol. Water may also be present in relatively small amounts, up to about 10% by weight. Unsaturated alcohols such as methyl butynol may also be employed. Mixtures of solvents may also be employed such as a mixture of of isopropanol and isopropyl acetate. The alcohol solvents may also be blended with aliphatic hydrocarbons such as hexane or low boiling naphthas.

The pigments are conventional ink pigments, the particular pigment employed being dependent on the particular opacity, tinting strength, and color desired. Illustrative of some suitable pigments are rutile titanium dioxide, carbon black, iron oxide, chrome yellow, phthalocyanine blue, phthalocyanine green, chrome orange, molybdate orange, and toluidine red.

Illustrative of some suitable modifiers are certain rosin derivatives such as ester gums and modified ester gums, maleic resins, rosin maleic condensation products, phenolic resins, waxes and nitrocellulose.

A typical formulation for a flexographic ink composition is as follows:

| | Parts by weight |
|---|---|
| Resin of this invention | 25 |
| Solvent (isopropanol-99% grade) | 55 |
| Pigment (rutile titanium dioxide) | 15 |
| Modifier (nitrocellulose) | 5 |

The embodiments of the present invention in which an exclusive property or privilege is claimed are defined as follows:

1. A polyamide-polyimide composition consisting essentially of the reaction product, at a temperature of 100–300° C. while removing the water of reaction, of
   (A) 90–100 equivalent percent of an alkylene diamine in which the alkylene group has from 2 to 8 carbon atoms,
   (B) 70–75 equivalent percent of a polymeric fat acid of a monocarboxylic aliphatic acid containing 8 to 24 carbon atoms,
   (C) 8–15 equivalent percent of hexahydrophthalic anhydride and
   (D) 10–22 equivalent percent of a monocarboxylic acid,
the improvement wherein said monocarboxylic acid is selected from the group consisting of isobutyric acid, 2-ethyl hexoic acid, 2-ethyl butyric acid and mixtures thereof.

2. A polyamide-polyimide composition as defined in claim 1 wherein said polymeric fat acid is polymerized tall oil fatty acids, said diamide is ethylene diamine and said mono-carboxylic acid is a mixture of isobutyric acid and 2-ethylhexoic acid.

3. A polyamide-polyimide composition as defined in claim 1 wherein said polymeric fat acid is polymerized tall oil fatty acids, said diamine is ethylene diamine and said monocarboxylic acid is a mixture of isobutyric acid and 2-ethyl butyric acid.

4. A polyamide-polyimide composition as defined in claim 1 wherein said polymeric fat acid is polymerized tall oil fatty acids, said diamine is ethylene diamine acid, said monocarboxylic acid is 2-ethyl hexoic acid.

References Cited

UNITED STATES PATENTS 3,383,391   5/1968   Carlick et al. _____ 260—326

ALEX MAZEL, Primary Examiner

J. A. NARCAVAGE, Assistant Examiner

U.S. Cl. X.R.

106—27, 26; 260—18, 33.4, 78, 281, 326.3

UNITED STATES PATENT OFFICE
CERTIFICATE OF CORRECTION

Patent No. 3,522,270          Dated July 28, 1970

Inventor(s) David W. Glaser

It is certified that error appears in the above-identified patent and that said Letters Patent are hereby corrected as shown below:

Column 4, Table I, footnote 1, delete "% M", second occurrence, and insert -- % D --. Column 5, line 54, delete "of", first occurrence. Column 6, line 53, delete "diamide" and insert -- diamine --.

Signed and sealed this 3rd day of November 1970.

(SEAL)
Attest:

EDWARD M. FLETCHER, JR.          WILLIAM E. SCHUYLER, JR.
Attesting Officer          Commissioner of Patents